United States Patent [19]

Chi

[11] Patent Number: 4,802,033

[45] Date of Patent: Jan. 31, 1989

[54] PREDICTIVE POSITIONING OFFSET COMPENSATION FOR HIGH TPI DISK SYSTEMS

[75] Inventor: Chao S. Chi, San Diego, Calif.

[73] Assignee: Eastman Kodak Company, Rochester, N.Y.

[21] Appl. No.: 928,332

[22] Filed: Nov. 7, 1986

[51] Int. Cl.[4] ........................ G11B 5/58; G11B 21/10
[52] U.S. Cl. ................................. 360/77.04; 360/75; 360/78.08
[58] Field of Search .......................... 360/75, 77, 78

[56] References Cited

U.S. PATENT DOCUMENTS

| 4,040,103 | 8/1977 | White | 360/75 |
| 4,207,601 | 6/1980 | Desai et al. | 360/78 |
| 4,698,702 | 10/1987 | Miyake | 360/78 |

OTHER PUBLICATIONS

IBM Technical Disclosure Bulletin, vol. 17, No. 6, Nov. 1974, A. Paton, Correction of Data Track Misregistration in . . . , pp. 1781-1783.

Primary Examiner—Raymond F. Cardillo
Assistant Examiner—David L. Robertson
Attorney, Agent, or Firm—Robert F. Cody

[57] ABSTRACT

Trackwise disparity between inductive record and magneto-resistive playback heads which are built on a common support is measured and memorized. Thereafter, during head-positioning, the memorized disparity is employed as a track-address bias for proper registration of the playback head, irrespective of its widthwise disparity relative to the record head. To achieve the aforesaid measurement, the invention provides for a self-calibrating algorithmic routine that generates the aforesaid bias.

3 Claims, 2 Drawing Sheets

PREDICTIVE POSITIONING OFFSET COMPENSATION FOR HIGH TPI DISK SYSTEMS

BACKGROUND OF THE INVENTION

1. Field of the Invention

This invention relates in general to magnetic recording apparatus and methods, and more particularly to a technique for providing tracking control for a recording system utilizing a "super high" number of tracks per inch (TPI), and in which the data stored in the respective tracks of a recording medium is stored at a high number of bits per inch (BPI).

2. Description Relative to the Prior Art

The requirement of a high number TPI, taken with the requirement of a high number BPI, poses a formidable problem when attempting to optimize the recording function: To record a high number BPI suggests that the relative speed between media-and-recording head during recording be relatively slow, whereby the flux change length associated with any given bit is exceedingly short. Recovery of recorded data from a relatively slow moving medium, however, militates against the use of an inductive playback head and, attendantly, the prior art has trended toward the use of flux sensitive magneto-resistive heads for purposes of playback, albeit that inductive heads are still used to effect the recording of data signals in the medium. A high number TPI, on the other hand, indicates tiny trackwise-dimensions for the recording and playback heads. Indeed, at a TPI of 1000, the track width (with guard bands) would be only about $800\mu''$ ($\mu'' = 10^{-6}$ inches).

Since, in a high TPI/BPI recording system, inductive heads are typically preferred for recording . . . and magneto-resistive heads are typically preferred for playback . . . it is desirable that the inductive and magneto-resistive heads be in nigh perfect trackwise alignment. Given that each recorded track is especially narrow to begin with, any track alignment disparity between the playback head and a recorded track will be productive of less-than-optimum playback.

As will be appreciated, there is a trend for the building—by film deposition techniques—of both an inductive head and a magneto-resistive head on a common support or substrate. Manufacturing tolerances being what they are, however, it would appear that trackwise disparity of between about $120\mu''$ to $160\mu''$ between inductive and magneto-resistive heads is not unlikely. Such a disparity, when considered in relation to a track width of only $800\mu''$ per, is especially obnoxious. Playback from a narrow track is difficult to begin with, and for the playback head to be "off-track" (even by a small amount) will compound an already difficult task.

SUMMARY OF THE INVENTION

To reconcile any trackwise disparity between inductive record and magneto-resistive playback heads which are, say, built on a common support, the invention provides for the measurement and memorization of the trackwise disparity between the heads. Thereafter, during head-positioning, the memorized disparity is employed as a track-address bias for proper registration of the playback head, irrespective of its widthwise disparity relative to the record head. To achieve the aforesaid measurement, the invention provides for a self-calibrating algorithmic routine that generates the aforesaid bias.

The invention will now be described with reference to the figures, wherein

Figure 1:
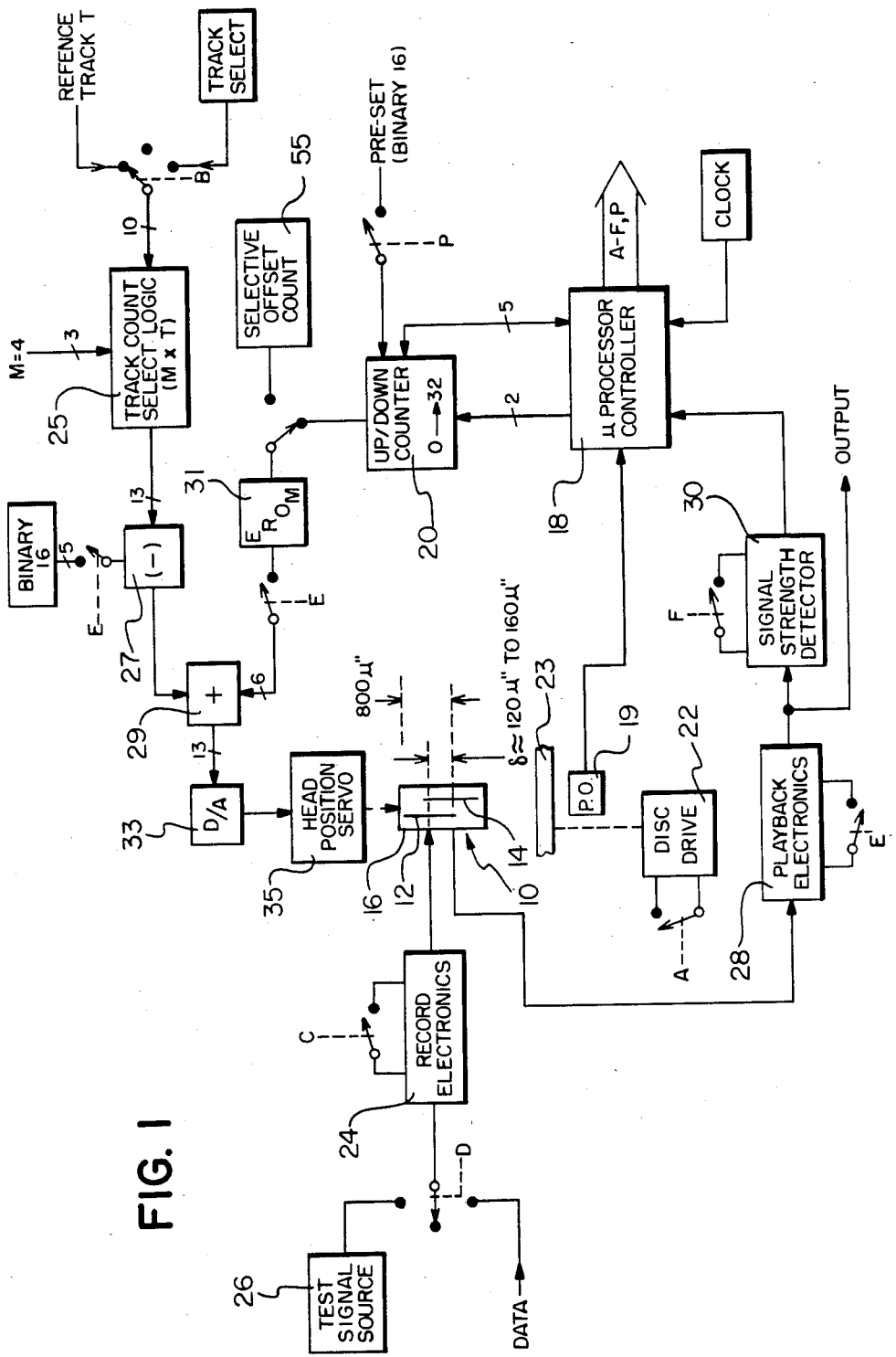
FIG. 1 is a schematic block diagram of an apparatus embodying the invention.

Before beginning a discussion of the workings of the invention, however, it would be well to examine FIG. 1 and, in particular, the composite magnetic head 10 thereof. The composite head 10 is comprised of a thin-film inductive head 12 and a thin-film flux sensitive head 14 (MR) on a common support 16. As aforesaid, the trackwise alignment of the heads 12, 14 can, because of limits associated with manufacturing tolerances, be less than absolutely perfect and, attendantly, a head-to-head trackwise disparity of $\delta$ (about, for example, $120\mu''$ to $160\mu''$) is indicated. Bearing in mind that, at the TPI of 1000, which is only a nominal value among commercially available disk products using a single record/playback head, the respective tracks that are recorded by the inductive head 12 are only about $800\mu''$ wide to begin with . . . as indicated on FIG. 1 . . . it will be appreciated that the indicated trackwise disparity between the heads 12, 14 will result in significant playback loss of a signal that is already intrinsically weak. Pursuant to the invention, the effects of the head-to-head disparity is nullified. Indeed, the invention in its presently preferred form provides for the automatic self-calibration of the head-to-head disparity and, during recording or playback, provides appropriate control to cancel the effect of such disparity.

In the interest of facilitating its understanding, the invention will be described in relation to three operational algorithms to be implemented by a microprocessor 18 (FIG. 1): The first algorithm (and a complementary subroutine) pertains to a "set-up" mode in which the track-to-track disparity between the heads 12, 14 is determined; the second algorithm pertains to the data recording operation; and the third algorithm pertains to the matter of playback.

SET-UP ALGORITHM

010 Pre-set Counter 20 to binary 16 (P).
020 Turn on Disc Drive 22 (A).
030 Position Record Head 12 to Reference Track T (B).
040 Turn on Record Electronics 24 (C).
050 Apply test signal from Source 26 (D).
060 Turn off Record Electronics 24 after N Disc Rotations (C).
070 Turn on Playback Electronics 28 (E).
080 Operate Disparity Self-Calibrating Routine by turning on Signal Strength Detector 30 (F).
090 Turn off Playback Electronics 28 (E).
094 Turn off Signal Strength Detector 30 (F).
096 Disarm Reference Track T select (B).
098 Turn off Disc Drive 22 (A).

DISPARITY CALIBRATION ROUTINE

081 Add binary 1: note whether signal strength increased or decreased.
082 Subtract binary 2: again note whether signal strength increased or decreased.
083 If a decrease in 081 and 082, add binary 1 and exit.
084 If a decrease in 081 and an increase in 082, then subtract binary 1: did signal strength increase?
085 If an increase in 084, subtract binary 1 and repeatedly subtract binary 1 until a decrease: then add binary 1 and exit.

086 If a decrease in 084, and binary 1 and exit.
087 If an increase in 081 and a decrease in 082, add binary 1: did signal strength increase?
088 If an increase in 087, add binary 1 and repeatedly add binary 1 until a decrease: then subtract binary 1 and exit.
089 If a decrease in 087, subtract binary 1 and exit.

RECORD ALGORITHM

210 Turn on Disc Drive 22 (A).
220 Turn on Record Electronics 24 (C).
230 Select track (B).
240 Set input to "Data" (D).
250 Reverse A→D when recording stops.

PLAYBACK ALGORITHM

310 Turn on Disc Drive 22 (A).
320 Select track (B).
330 Apply bias and correction counts (E).
340 Reverse A, B, E when playback stops.

Now, with the above-indicated algorithms in mind, reference should again be had to FIG. 1 as the discussion centers on "Set-Up": The counter 20, which is an up-down counter capable of counting from zero to binary 32, is pre-set (010) to binary 16; and the disc drive 22 is turned on (020) to rotate a magnetic recording disc 23. As will be appreciated, a programmable read-only-memory 31 receives and stores the count of the counter 20. In response to a command (030) from the microprocessor 18, a count corresponding to a reference track T is applied to a track count select logic circuit 25, to which an "increment" count M is also applied. The track count select logic circuit performs a multiplication function; and so, assuming for example the arbitrary selection of a track T (binary) count of 250 . . . and utilizing an "increment" count of binary 4 applied to the circuit 25 . . . the output thereof would be a count of binary 1000. At this juncture in the set-up procedure, the count of binary 1000 is applied via a subtraction circuit 27 and a summing circuit 29 to a digital-to-analog converter 33. Attendantly a head position servo 35 increments, at four per track, the record head 12 to the reference track (T=250) of the disc 23.

With the head 12 so positioned, record electronics 24 are activated (040) to allow a test signal from the source 26 to be applied (050) to the head 12 for recording in the track T=250. After N rotations of the disc 23, as determined by a pick-off 19, the record electronics 24 are turned off (060); and thereafter the playback electronics 28 are turned on (070). At this time, the memorized pre-set binary 16 of the counter 20 is applied to the summing circuit 29, and binary 16 is applied to the subtraction circuit 27.

To see how the Disparity Calibrating Routine operates (080) to identify the head-to-head disparity δ between the heads 12 and 14, consider the following: Bearing in mind that the circuit of FIG. 1 is in its playback mode at this time, the microprocessor 18 increases (081) the count of the counter 20 by binary 1, thereby causing the head 14 to re-position by a quarter track width. This either increases or decreases the output of the signal strength detector 30, which may be an envelope detector. The signal strength change is communicated to the microprocessor 18, which notes the change. Next, the microprocessor 18 decreases the count (082) of the counter 20 by binary 2, thereby incrementing the head in reverse by a half track width; and again the signal strength change is noted. If δ had equalled zero (083), both (081) and (082) would have indicated decreased signal strength, and the heads 12, 14 would have been, ab initio, in alignment. Thus, by adding binary 1 (at 083) to the counter 20, the heads 12, 14 are restored to their original position of alignment . . . and the count of the counter 20 is again binary 16.

Figure 2:
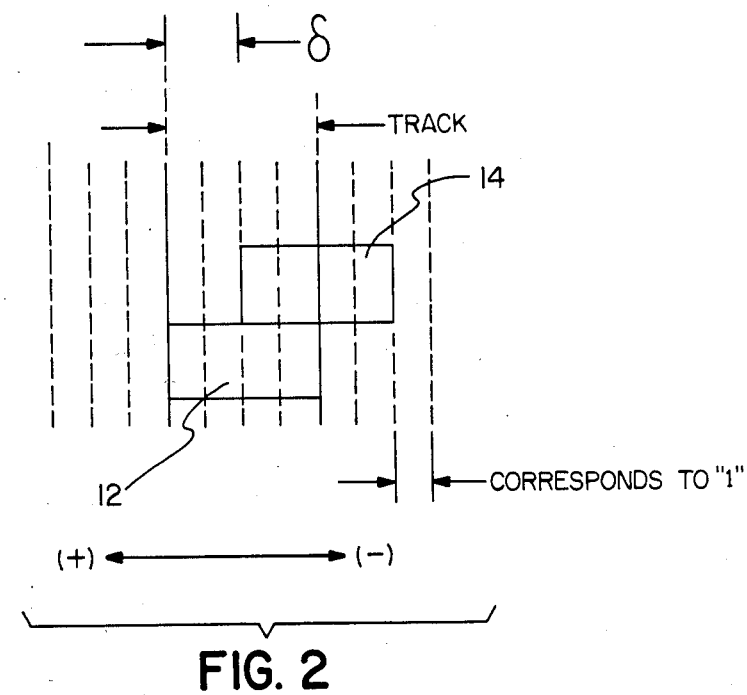
FIG. 2 is a diagram useful in describing the workings of the invention.

To understand further the workings of the Disparity Calibration Routine, reference should be made to the "specific" showing of FIG. 2 in which there is, by way of example, a δ of one-half track width. In such a situation: 081=increase, as the head 14 moved leftward in FIG. 2; 082=decrease, as the head moved rightward. Therefore, at the occurrence of 087 in the routine, in response to the addition of binary 1 to the count of the counter 20, the head moves leftward from the position depicted, at which 087=increase. At 088, the head again moves to the left, thereby again increasing the playback signal strength. Again, the count of the counter 20 is increased to move the head 14, only this time into alignment with the FIG. 2 track. To check the matter of head (14)-to-track alignment, the microprocessor 18 again increases the count of the counter 20, only this time the detected signal strength decreases. Thus, in 088, the microprocessor subtracts binary 1 from the counter 20 to recover the head (14)-to-track alignment. At this juncture, the count of the counter is binary 18, reflecting the fact that there are two "increments" (18−16=2) of widthwise disparity between the record head 12 and playback head 14. The count of binary 18 is memorized (EROM 31) so that, when algebraically combined with the bias count of binary 16, tracking for playback or recording purposes can be shifted by 2 quarter-tracks, as needed.

Assuming a start at track "zero", with the intention to record in, say, track 129, the disc drive is activated (210), followed by the energization of the record electronics 24, and the application of a binary count of 129×4 to the digital-to-analog converter 33 to cause the head 12 to increase in 476 steps to track 129. Thereafter, the data to be recorded is applied to the record electronics 24 for recording on the disc 23.

Again assuming a start at track "zero", and given that the EROM 31 stores the count of binary 18, as aforedescribed, playback of the information recorded in representative track 129 works as follows: a count of binary 476 is applied to the difference circuit 27, wherein binary 16 is subtracted therefrom to provide the count of binary 460, which is applied to the summing circuit 29. The summing circuit 29 also receives—given a head-to-head disparity δ of two quarter track widths between heads 12, 14 as depicted in FIG. 2—the memorized count of binary 18 that is stored by the EROM 31, thereby causing a count of 478 to be applied from the summing circuit 29 to the digital-to-analog converter 33, which in turn causes the playback head to move in 478 incremental steps so that the head 14 precisely aligns with the track 129 that had been recorded by the head 12.

The invention has been described in detail with particular reference to a presently preferred embodiment, but it will be understood that variations and modifications can be effected within the spirit and scope of the invention. For example, while the invention is cast in the environment of a recording disc format, it will be appreciated that the invention is practicable as well with web-like media such as magnetic tape. Further, although indicated for use with single track heads, the concept of the invention is just as adaptive to use with multitrack head configurations. Indeed, if desired, a selective offset count 55 (derivable or modifiable, for example, in response to environmental or other means), and which may be programmable, may be employed as an input to the EROM 31 to alter, either or both, the record or playback tracking procedures. Further, the indicated inductive head or write and flux sensitive magneto-resistive head for read can be replaced by probe head for write and inductive head for read in perpendicular recording or replaced by any other two element structures to optimize write and read functions separately.

What is claimed is:

1. Magnetic recording and playback apparatus comprising
   A. head support means,
   B. a thin-film inductive magnetic head supported by said base support means,
   C. a thin-film magneto-resistive magnetic head also supported by said head support means in at least approximate trackwise alignment with said thin-film inductive magnetic head,
   D. means for storing a signal proportional to any trackwise disparity in the alignment of said thin-film inductive and magneto-resistive heads,
   E. address means for generating a signal to position said head support means for recording by said thin-film inductive head in relation to a recording track of a magnetic recording medium, and
   F. means cooperating with said address means for modifying the signal generated thereby to position said head support means for the playback of recorded signals by said magneto-resistive playback head, said means for providing said signal proportional to trackwise disparity comprising
      I. playback circuit means for detecting the strength of signals produced by said magneto-resistive head, and
      II. microprocessor means cooperative with said address means and said playback circuit means for
         a. incrementally positioning said head support means by discrete fractions of the width of a recording track to maximize said signals produced by said magneto-resistive head and
         b. in correspondence with such incremental positioning, producing said signal proportional to the trackwise disparity between said inductive and magneto-resistive heads.

2. The apparatus of claim 1 further comprising means for modifying the signal stored by said means for storing.

3. The apparatus of claim 1 further comprising means forming part of said apparatus for producing said signal proportional to trackwise disparity between inductive and magneto-resistive heads.

* * * * *

UNITED STATES PATENT AND TRADEMARK OFFICE
CERTIFICATE OF CORRECTION

PATENT NO. : 4,802,033
DATED : January 31, 1989
INVENTOR(S) : Chao S. Chi

It is certified that error appears in the above-identified patent and that said Letters Patent is hereby corrected as shown below:

Column 5, Claim 1, claim line 5, after "said", delete "base" and insert therefor --head--

Signed and Sealed this

Twelfth Day of June, 1990

Attest:

HARRY F. MANBECK, JR.

*Attesting Officer*  *Commissioner of Patents and Trademarks*